United States Patent
Simanzhenkov et al.

(10) Patent No.: US 11,549,063 B2
(45) Date of Patent: Jan. 10, 2023

(54) THERMAL DECOMPOSITION IN CHEMICAL LOOPING COMBUSTION

(71) Applicant: NOVA CHEMICALS (INTERNATIONAL) S.A., Fribourg (CH)

(72) Inventors: Vasily Simanzhenkov, Calgary (CA); Rabi Dey, Calgary (CA); Hany Farag, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 17/435,088

(22) PCT Filed: Mar. 6, 2020

(86) PCT No.: PCT/IB2020/051978
§ 371 (c)(1),
(2) Date: Aug. 31, 2021

(87) PCT Pub. No.: WO2020/183327
PCT Pub. Date: Sep. 17, 2020

(65) Prior Publication Data
US 2022/0145192 A1  May 12, 2022

(30) Foreign Application Priority Data

Mar. 13, 2019 (CA) .................. CA 3036625

(51) Int. Cl.
*C10G 9/36* (2006.01)
*C10G 9/30* (2006.01)
*C10G 59/04* (2006.01)

(52) U.S. Cl.
CPC ............... *C10G 9/36* (2013.01); *C10G 9/30* (2013.01); *C10G 59/04* (2013.01); *C10G 2300/4075* (2013.01)

(58) Field of Classification Search
CPC .................. C10G 9/28–32; C10G 9/36
See application file for complete search history.

(56) References Cited

U.S. PATENT DOCUMENTS

| | | | | |
|---|---|---|---|---|
| 4,840,928 A | * | 6/1989 | Harandi | C10G 57/00 502/41 |
| 5,171,540 A | * | 12/1992 | Wells | B01J 8/1818 239/602 |
| 7,540,893 B2 | | 6/2009 | Liu et al. | |
| 9,956,544 B2 | | 5/2018 | Schammel et al. | |

(Continued)

FOREIGN PATENT DOCUMENTS

WO    WO 2018/005456    1/2018

OTHER PUBLICATIONS

Don W. Green, Robert H. Perry. Perry's Chemical Engineers' Handbook, Eighth Edition. vol. 8th ed. McGraw-Hill Education; Chapter 19, pp. 19-27-19-36. (Year: 2008).*

(Continued)

*Primary Examiner* — Renee Robinson
(74) *Attorney, Agent, or Firm* — Fish & Richardson P.C.

(57) ABSTRACT

A method is presented of thermal decomposition to crack ethane and/or higher alkane hydrocarbon feed or the mixture of any of these hydrocarbons to break down into component elements or simpler constituents using heat from a hot metal agent from a chemical looping combustion process.

20 Claims, 2 Drawing Sheets

(56) References Cited

U.S. PATENT DOCUMENTS

| | | |
|---|---|---|
| 2012/0214106 A1 | 8/2012 | Sit et al. |
| 2016/0102255 A1* | 4/2016 | Hoteit ................... F23C 10/01 431/170 |
| 2016/0318828 A1 | 11/2016 | Washburn et al. |
| 2017/0210685 A1 | 7/2017 | Simanzhenkov et al. |
| 2017/0313637 A1 | 11/2017 | Sofranko et al. |

OTHER PUBLICATIONS

International Preliminary Report on Patentability in International Appln. No. PCT/IB2020/051978, dated Aug. 25, 2021, 6 pages.

* cited by examiner

THERMAL DECOMPOSITION IN CHEMICAL LOOPING COMBUSTION

CROSS-REFERENCE TO RELATED APPLICATION

This application is a National Stage Application under 35 U.S.C. § 371 and claims the benefit of International Application No. PCT/IB2020/051978, filed Mar. 6, 2020, which claims priority to CA Application Serial No. 3036625, filed on Mar. 13, 2019. The disclosure of the prior application is considered part of and is incorporated by reference in the disclosure of this application.

TECHNICAL FIELD

The present invention relates to a process to thermally decompose alkanes, including ethane and/or higher hydrocarbons, using heat from a hot metal agent from a chemical looping combustion process.

BACKGROUND ART

The cracking furnaces in commercial steam cracking processes are reaching the limits of efficiency. The yield and selectivity largely depends on the mechanism of heat transfer and how the hydrocarbon feedstock is brought in contact with the heat source. Cracking furnaces suffer from coke formation and deposition issues leading to productivity loss. As well, current steam cracking furnaces are large sources of greenhouse gases which are very expensive to capture from the flue gas.

U.S. Pat. No. 7,540,893 issued Jun. 2, 2009 to Liu and Zamansky, assigned to General Electric Company, described a system and method for producing synthesis gas including a regeneration zone. The regeneration zone included a first fluidized bed configured to receive an oxidant for producing a regenerated oxygen transfer material (OTM). The system further included a mixed reforming zone comprising a second fluidized bed configured to receive a first fuel and the regenerated OTM to produce a first reformate stream and a steam reforming zone comprising a third fluidized bed configured to receive the first reformate stream, a second fuel and steam to produce the synthesis gas. The regeneration zone, mixed reforming zone and steam-reforming zone were in fluid communication with each other. The temperature in the catalytic partial oxidation (CPO) mixed reforming zone was 700° C. to 1100° C. There was no third reactor to heat ethane to 900° C.

International Patent Application WO 2018/005456 filed Jun. 27, 2017 to Sofranko et al., assigned to Bio2Electric, LLC, described enhanced oxygen transfer agent systems and methods of use thereof. They described a method for producing olefins from a hydrocarbon feed including the step of contacting a hydrocarbon feed comprised of one or more alkanes with an oxygen transfer agent at a temperature of 350° C. to 1000° C. The oxygen transfer agent comprised an oxygen-donating chalcogen agent comprised of at least one of S, Se, or Te and a reducible metal oxide. The chalcogen had an oxidation state greater than +2. They also described a method for producing one or more olefins by partial combustion of a hydrocarbon feed including partially combusting a hydrocarbon feed comprised of one or more alkanes by contacting the hydrocarbon feed with an oxygen transfer agent comprising $CaSO_4$ at a temperature of 350° C. to 1000° C. to produce one or more olefins comprising ethylene and coproducing water. This is an oxidative dehydrogenation (ODH) process using $CaSO_4$ as the oxygen transfer agent in the moving bed type process.

US Patent Application 2012/0214106 by Sit et al., assigned to New York Blood Center, filed Oct. 13, 2011 (abandoned) describes a chemical looping combustion process for producing heat or steam or both from a hydrocarbon fuel. A metal oxide oxygen carrier is reduced from an initial oxidation state in a first reduction reaction with a hydrocarbon fuel to provide $CO_2$, $H_2O$, heat, and a reduced metal or metal oxide having a first reduced state, the first reduced state lower than the initial oxidation state, and then the reduced metal or metal oxide from the first reduced state is further reduced in a second reduction reaction with additional hydrocarbon fuel to provide $CO_2$, $H_2O$, heat, and a further reduced metal or metal oxide having a second reduced state, the second reduced state lower than the first reduced state. The further reduced metal or meal oxide was oxidized, substantially back to the initial oxidation state with air to produce $N_2$, $O_2$ and heat. This patent application does not describe a third reactor.

US Patent Application 2017/0313637 by Sofranko et al., provisionally filed on Sep. 24, 2014, assigned to Bio2Electric, LLC and North Carolina State University, described an oxygen transfer agent useful for the oxidative dehydrogenation of saturated hydrocarbons including at least one mixed oxide derived from manganese or compounds thereof, as well as a promoter, such as tungsten and/or phosphorous. The oxygen transfer agent may also include an alkali metal or compounds thereof, boron or compounds thereof, an oxide of an alkaline earth metal, and an oxide containing one or more of one or more of manganese, lithium, boron, and magnesium. A reactor was at least partially filled with the oxygen transfer agent in the form of a fixed or circulating bed and provided an unsaturated hydrocarbon product, such as ethylene and/or propylene. The oxygen transfer agent may be regenerated using oxygen.

U.S. Pat. No. 9,956,544 by Schammel et al., May 1, 2018, assigned to Siluria Technologies, Inc., described heterogeneous catalysts with optional dopants. The catalysts were useful in a variety of catalyst reactions, for example, the oxidative coupling of methane to $C_{2+}$ hydrocarbons. The catalyst used lanthanide elements.

US Patent Application 2017/0210685 by Simanzhenkov et al., filed Oct. 8, 2015, assigned to NOVA Chemicals, described catalytically oxidatively dehydrogenating ethane to ethylene at high conversions and high selectivity in a circulating fluidized bed (CFB) reactor in the presence of oxygen in the feed in an amount above the flammability limit. The reactor had an attached regeneration reactor to regenerate the catalyst and cycle back to the CFB.

SUMMARY OF INVENTION

Extracting heat from the reduced oxides from the fuel reactor to crack ethane and then passing the cooled oxides to the air reactor is not taught by any of the previous examples.

An embodiment of the disclosure provides a process for thermally cracking one or more $C_2$-$C_8$ hydrocarbons comprising integrating a chemical looping combustion reaction with a steam cracker wherein: a) a moving bed of reduced inorganic particulates having a melting temperature greater than 1500° C. and a particle size from 10 to 300 microns is passed through an oxidation reactor at a temperature from 300° C. to 1200° C. for a period of time less than 2 minutes at a gas hourly space velocity for the oxidant from 500 $hr^{-1}$ to 6000 $hr^{-1}$, weight hourly space velocity from 0.5 $hr^{-1}$ to 60 hr$^{-1}$, to oxidize not less than 20 wt % of said inorganic particulates passing through said oxidation reactor; passing said oxidized inorganic particulates to and through a moving bed in a fuel reactor together with a fuel in the absence of a gaseous oxidant for a period of time of less than 2 minutes at a gas hourly space velocity for the fuel from 500 hr$^{-1}$ to 6000 hr$^{-1}$, weight hourly space velocity from 0.5 hr$^{-1}$ to 60 hr$^{-1}$, to substantially burn the fuel and any surface carbon on the inorganic particulates and reduce the inorganic particulates and heat them to a temperature from 1000° C. to 1200° C.; passing said heated reduced inorganic particulates as a moving bed through at least a portion of a dehydrogenation reactor, concurrently or counter-currently, optionally with steam and one or more alkanes at a temperature from 750° C. to 1200° C. for a period of time less than 2 minutes at a gas hourly space velocity for the alkanes from 500 hr$^{-1}$ to 6000 hr$^{-1}$, weight hourly space velocity from 0.5 hr$^{-1}$ to 60 hr$^{-1}$, to produce a product stream comprising: $H_2$, one or more olefins, steam, and mixtures of alkynes, aromatics, di-olefins, heavy hydrocarbons and coke; and passing the reduced inorganic particulates from said dehydrogenation reactor to said oxidation reactor.

In a further embodiment, the feed to the dehydrogenation reactor comprises one or more $C_2$-$C_4$ alkanes.

In a further embodiment, the particulates are selected from at least one promoter selected from the group consisting of Lithium (Li), Sodium (Na), Magnesium (Mg), Phosphorus (P), Potassium (K), Calcium (Ca), Titanium (Ti), Vanadium (V), Chromium (Cr), Manganese (Mn), Iron (Fe), Cobalt (Co), Nickel (Ni), Copper (Cu), Zinc (Zn), Gallium (Ga), Arsenic (As), Rubidium (Rb), Strontium (Sr), Yttrium (Y), Zirconium (Zr), Niobium (Nb), Molybdenum (Mo), Ruthenium (Ru), Tin (Sn), Antimony (Sb), Cesium (Cs), Barium (Ba), Lanthanum (La), Cerium (Ce), Praseodymium (Pr), Samarium (Sm), Tungsten (W), Bismuth (Bi), and combinations thereof.

In a further embodiment, the oxidation reactor is operated at a temperature from 500° C. to 1300° C.

In a further embodiment, the oxidation reactor is a riser reactor.

In a further embodiment, the oxidation reactor is a fluid catalytic cracking reactor.

In a further embodiment, the oxidation reactor is a circulating bed reactor.

In a further embodiment, the dehydrogenation reactor has an outlet temperature from 850° C. to 1200° C.

In a further embodiment, not less than 80 wt % of the inorganic particles in the oxidation reactor are oxidized to a higher oxidation state.

In a further embodiment, the particle size for the particulate is from 40 to 150 microns.

In a further embodiment, in the oxidation reactor the gas hourly space velocity for the oxidant is from 1000 hr$^{-1}$ to 5000 hr$^{-1}$, weight hourly space velocity from 0.5 hr$^{-1}$ to 60 hr$^{-1}$.

In a further embodiment, the fuel for the fuel reactor is natural gas.

In a further embodiment, the fuel reactor the gas hourly space velocity for the fuel is from 1000 hr$^{-1}$ to 5000 hr$^{-1}$, weight hourly space velocity from 0.5 hr$^{-1}$ to 60 hr$^{-1}$.

In a further embodiment, in the dehydrogenation reactor the gas hourly space velocity for the alkane and steam is from 1000 hr$^{-1}$ to 5000 hr$^{-1}$, weight hourly space velocity from 0.5 hr$^{-1}$ to 60 hr$^{-1}$.

In a further embodiment, the process comprises a heat exchanger to extract heat from the exhaust from the fuel reactor and to provide heat to the alkane prior to it entering the dehydrogenation reactor.

In a further embodiment, the hydrocarbon is one or more alkane.

In a further embodiment, the one or more alkane is ethane.

DESCRIPTION OF EMBODIMENTS

Figure 1:
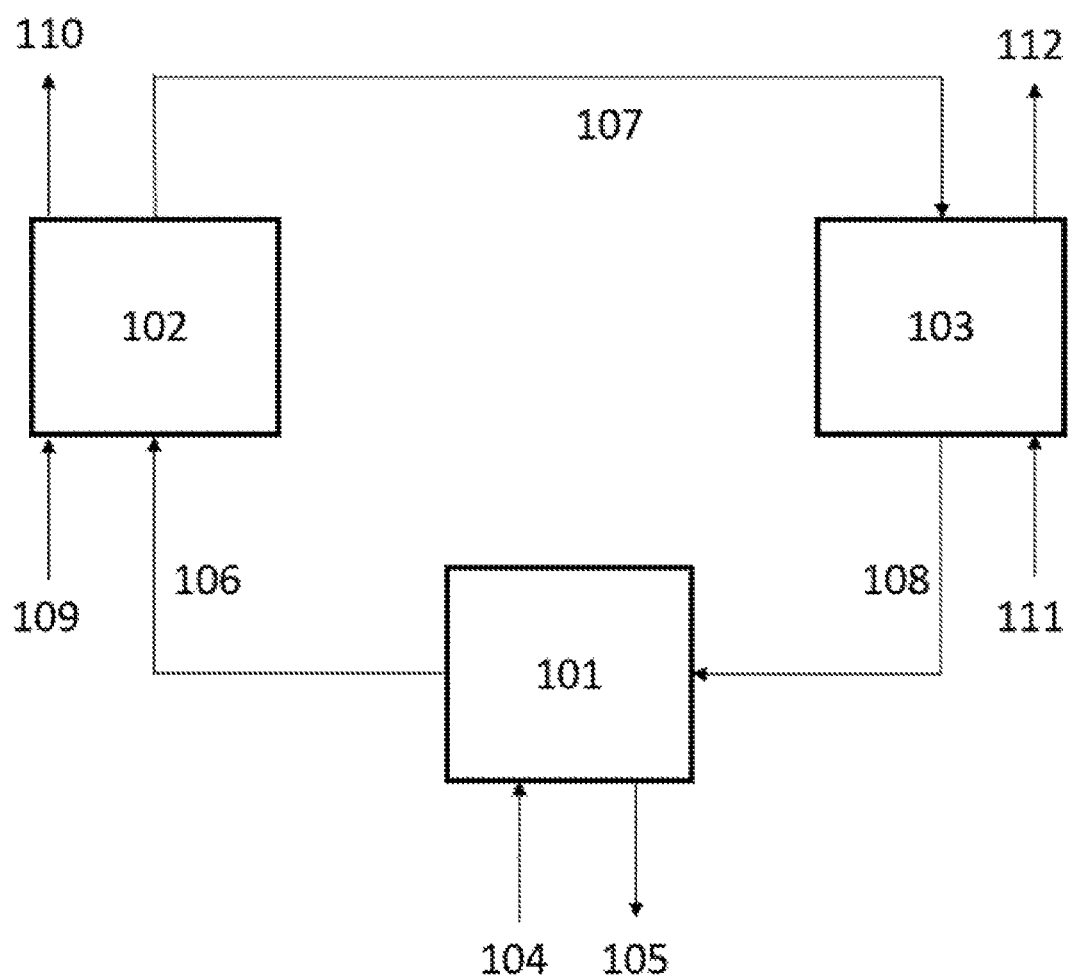
FIG. 1 is a schematic representation of the disclosed process.

A novel method of thermal decomposition to crack $C_2$ and/or higher alkane hydrocarbons feed or the mixture of any of these hydrocarbons to break down into component elements or simpler constituents using heat from a hot metal agent from a chemical looping combustion process is herein described.

The cracking furnaces in commercial steam cracking process are reaching the limits of how they can be optimized beyond its current efficiency. The yield and selectivity largely depends on the mechanism of heat transfer and how the hydrocarbon feedstock is brought in contact with the heat source. The method described herein allows direct heat transfer, close to 100% efficiency and a configuration of short residence time cracking process. The rapid and thorough mixing of the hydrocarbon feedstock with the heat source in a fluidized bed reactor gives the benefit of short residence time cracking and thus avoids secondary cracking.

Current cracking furnaces suffer from coke formation and deposition issues leading to productivity loss. The method described herein does not suffer from coke formation issues, instead potentially benefiting if coke is formed or deposited on the heat transfer medium.

Current steam cracking processes are large emitters of greenhouse gases which are very expensive to capture from the flue gas. The method described herein offers the opportunity to capture the greenhouse gas easily and inexpensively while cracking alkanes.

The chemical looping combustion process is a semi-commercial technology where solid oxygen carrier (metal oxide) transfers $O_2$ from air to the fuel. The reduced form of metal reacts with oxygen from air in an air reactor and gets oxidized. The oxidized form of metal donates oxygen to fuel in the fuel reactor and gets reduced.

The metal agent is an oxygen carrier agent, typically a metal oxide like iron oxide, nickel oxide, manganese oxide etc. which may be used in the chemical loop combustion process. The oxygen carrier can also optionally be diluted with a high heat capacity material which will rather store the heat and release the gas phase to allow to manage how much heat is going to the cracking reactor and how much is taken away by the gaseous effluent stream from the air reactor or fuel reactor.

The method of coupling of chemical combustion loop process with hydrocarbon cracking process is herein disclosed. The method involves utilization of heat from the metal agent from the fuel reactor to perform the cracking reaction of alkanes in a separate reactor. The reduced form of metal agent from the fuel reactor may be brought in contact with the alkane molecules for heat transfer in the cracking reactor to crack alkane molecules into olefins.

Chemical looping combustion (CLC) processes are being used in commercial applications. However, CLC processes coupled with a cracking reactor have not been previously proposed.

The method of cracking of alkane hydrocarbons is done by integration of three processes:

1. The oxidation of metal agent(s) to metal oxide(s), or lower valance state metal oxide to higher valance state metal oxides in presence of air;
2. The combustion of fuel with the oxygen from metal oxides to produce energy; and
3. The cracking of hydrocarbon feed utilizing the heat from hot metal agent.

The method includes three reactors coupled in a cyclic process. The metal agent flows cyclically from one reactor to the other. With reference to FIG. 1, the metal oxides (107) in its higher oxidation state flows from Air Reactor (102) to Fuel Reactor (103). The stream (107) may comprise of metal oxide at its higher valance state like iron oxides ($Fe_2O_3$), nickel oxide (NiO), copper oxide (CuO), and manganese oxide ($Mn_2O_3$) at any temperature range between 300° C. to 1200° C.

The solid metal oxide may be separated from the other gaseous reactants and products by a cyclone separator (not shown) and transported to the fuel reactor (103) by pressure difference. The fuel reactor (103) may be close-coupled with the air reactor (102) system.

The metal oxides agent may be fluidized in the fuel reactor (103) where fuel (111) is introduced and combusted. The fuel (111) can be hydrocarbons like natural gas or hydrogen produced from the cracking reactor (101) or mixture of both. The combustion reaction occurs between hydrocarbon and the oxygen present in the metal oxides. The metal oxides losses its oxygen and converts to elemental metal form or reduced state of oxides form. The hydrocarbon converts to carbon dioxide and water and may produce some amount of carbon monoxide (112). The energy produced during the combustion reaction will be carried by the outflow leaving the system which is the gaseous product stream and solid reduced metal stream.

As shown in FIG. 1, the reduced metal stream (108) may again be separated by a cyclone (not shown) from the gaseous feed and product mixture and transported to the cracking reactor (101). The reduced metal agent can be fluidized in the reactor (101) where the pre-heated or cold hydrocarbon feed stream (104) is introduced.

The reduced metal stream (108) may contain elemental metal like Ni, Fe or reduced form of metal oxides like FeO, $Cu_2O_3$, or MnO. The temperature of the stream (108) may vary from 1000° C. to 1200° C.

Figure 2:
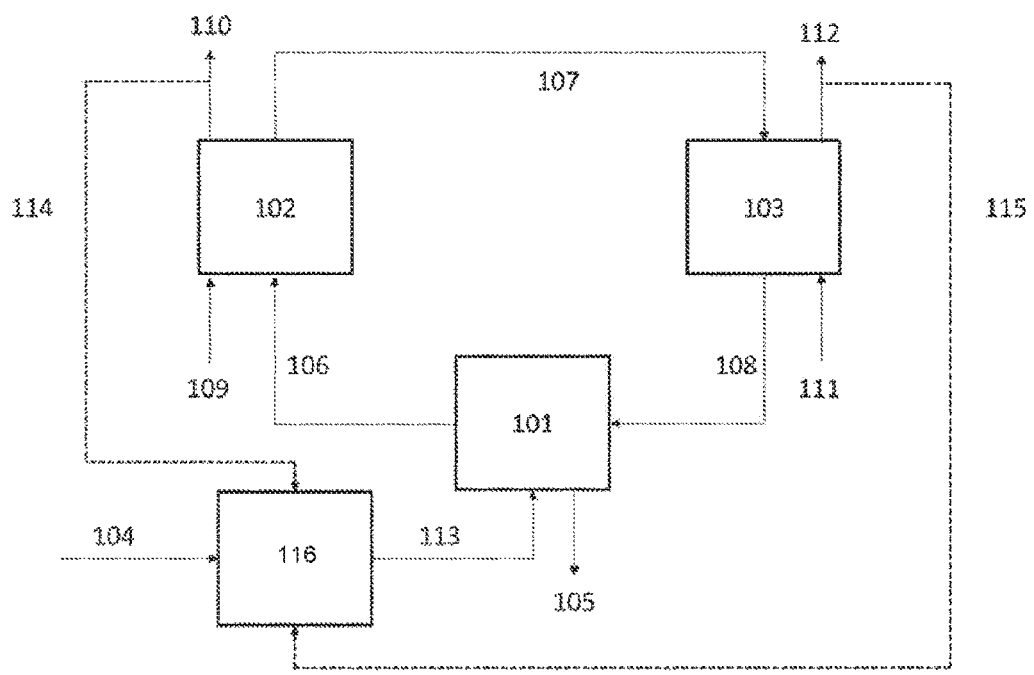
FIG. 2 is a schematic representation of the disclosed process, including a feed pre-heater.

With reference to FIG. 2, the hydrocarbon feed stream (113) can be preheated in a preheater (116) with the heat produced either from air reactor (114) or fuel reactor (115).

Inside the cracking reactor (101), the heat transfer takes place from hot metal agent to relatively cold hydrocarbon feed stream (104) and the cracking of hydrocarbons occurs when the cracking temperature is attained. The typical cracking temperature can be achieved between 750° C. to 900° C. Steam may also be introduced in the cracking reactor to avoid large coke formation.

The solid metal agent may be separated from the gaseous hydrocarbon reactant and product mixture through a cyclone separator (not shown) and metal stream (106) may be lifted back to the air reactor.

The metal stream (106) contains the same composition as metal stream (108). The stream temperature may vary from 750° C. to 900° C.

The metal agent may be fluidized inside the air reactor (102) where air (109) is introduced as a reactant.

Inside the air reactor (102), the reduced metal reacts with oxygen present in the air (109) to form metal oxides from elemental metal or converts from lower valance state to higher valance state metal oxides. Any coke deposits with the metal agent is burned off partially or completely in this reactor.

The oxidized metal oxides from the air reactor may be separated through a cyclone separator (not shown) and transferred (107) to Fuel reactor (103).

The cracked gas (105) from the cracking reactor (101) may comprise ethylene, mixture of olefins, alkynes and other by products depending on the hydrocarbon feedstock composition.

The cracked gas (105) can be further separated by conventional separation method to produce pure stream.

Steam at various pressure levels (ex., high pressure, medium pressure and low pressure) can be generated from boiler feed water (BFW) using the heat from the oxygen depleted hot air from the Air Reactor (102). Generated steam can be introduced to the Cracking Reactor (101) at a fixed ratio with hydrocarbon to control the cracking severity. The steam-condensate obtained from the cracked gas after quenching can be recycled as BFW feed. Steam can also be generated using the heat (115) from the combustion gas from Fuel Reactor (103). Any additional steam generated from the process can be used in turbine-driven rotating equipment.

The above process produces combustion gas mixture containing $CO_2$ and $H_2O$ only. The $H_2O$ can be easily separated from the mixture by condensing water in a cooler and pure $CO_2$ can be produced easily. The method is a single step, non-expensive method of capturing $CO_2$ from the process. The combustion gas (flue gas) from the conventional steam cracking process contains a high concentration of $N_2$ in the mixture which makes the $CO_2$ capture process very capital and energy intensive.

The captured $CO_2$ from the process can be converted partially to methanol or other type of oxygenates by reacting with hydrogen produced at cracking reactor. In order to convert all of the $CO_2$ generated in the process into methanol, additional $H_2$ might be required.

Example

The process to thermally decompose alkanes, including ethane and/or higher hydrocarbons, using heat from a hot metal agent from a chemical looping combustion process has been simulated using AspenPlus® commercial simulator, and is presented schematically in FIG. 2.

The metal oxides simulated were $Mn_3O_4$ (Trima-01) and MnO (Manga-02). Trima-01 and Manga-02 were chosen to represent the most active portion of the oxygen carrier for the reactor; other ceramic materials, such as MgO or CaO may increase the temperature at which the mobility and reactivity of the molecules in a liquid state become appreciable (the "Tammann Temperature", after Gustav Tammann) of the oxygen carrier and allow longer service life of the material.

The reaction in the Air Reactor, 102, is:

$$O_2 + 6Manga\text{-}02 \rightarrow 2Trima\text{-}01$$

In the Fuel Reactor, 103, the reaction is:

$$2Trima\text{-}01 \rightarrow 6Manga\text{-}02 + O_2$$

In the Cracking Reactor, 101, the reaction is:

$$C_2H_6 \rightarrow C_2H_4 + H_2$$

Other reactions were not considered. The reactors are modelled as adiabatic. The air oxidation of metal is exothermic. The Air Reactor (AR) outlet temperature, 110, was calculated to be 1324° C. The flow rate to the AR, 109, was set such that most of the $O_2$ is consumed in the AR reactor, 102.

The heat associated with the air, 110, from the AR, 102, was used to produce high pressure (HP) steam. The solid stream, 107, from the AR, 102, to the Fuel Reactor (FR), 103, was calculated to be at a temperature of 1324° C.

Two reactions take place at the FR, 103. In the first reaction, metal oxide loses oxygen to become lower valency metal oxide; $Mn_3O_4$, 107, becomes MnO, 108, through an endothermic process. In the second reaction, methane, 111, is injected into the FR, 103, where methane reacts with oxygen to produce $CO_2$, 112. The latter reaction is exothermic. Overall, the process is slightly endothermic.

The FR reactor, 103, outlet temperature is calculated to be 1214° C. The $CO_2$ stream heat, 115, from the FR, 103, and $H_2O$ stream heat, 114, from the AR, 102, is used to heat cold ethane, 113, to 500° C., 104, before going to the Cracking Reactor, 101. The Cracking Reactor (CR) outlet temperature, 105, is maintained around 830° C.

Solid MnO from the CR, 101, goes back to the AR, 102, at 830° C., 106.

The results were that the chemical looping combustion-coupled ethane cracking system, with 9.27 ton/hr of air circulation to the AR, 109, 0.54 ton/hr of methane injection to the FR, 111, and 25.17 ton/hr of metal oxide circulation between AR-FR-CR, 106, 107 and 108, the amount of ethane that was cracked was 1.13 ton/hr, 105.

The temperature of the FR gas exit stream, 112, can be further reduced to less than 100° C. by generating various level of steam. The water will condense out from the mixture leaving water-saturated $CO_2$ in the gas phase. The $CO_2$ can be converted to methanol according to the following reaction:

$$CO_2 + 3H_2 \rightarrow CH_3OH + H_2O$$

For the above example, 29.6 kg-mole of carbon dioxide is produced from FR, 112, and 38.5 kg-mole of hydrogen produced in the CR, 105. Therefore around 43% of captured $CO_2$ can be converted into chemicals using the hydrogen produced from the same system.

INDUSTRIAL APPLICABILITY

This disclosure relates to a process for thermally cracking one or more $C_2$-$C_8$ hydrocarbons wherein a chemical looping combustion reaction is integrated with a steam cracker.

The invention claimed is:

1. A process, comprising:
   passing a moving bed of reduced inorganic particulates having a melting temperature greater than 1500° C. and a particle size from 10 to 300 microns through an oxidation reactor at a temperature from 300° C. to 1200° C. for a period of time less than 2 minutes at a gas hourly space velocity for an oxidant from 500 $hr^{-1}$ to 6000 $hr^{-1}$, and a weight hourly space velocity from 0.5 $hr^{-1}$ to 60 $hr^{-1}$, wherein not less than 20 wt % of said reduced inorganic particulates passing through said oxidation reactor are oxidized to produce oxidized inorganic particulates;
   passing said oxidized inorganic particulates to and through a moving bed in a fuel reactor together with a fuel in the absence of a gaseous oxidant for a period of time of less than 2 minutes at a gas hourly space velocity for the fuel from 500 $hr^{-1}$ to 6000 $hr^{-1}$, and a weight hourly space velocity from 0.5 $hr^{-1}$ to 60 $hr^{-1}$, to burn the fuel and any surface carbon on the oxidized inorganic particulates and reduce the oxidized inorganic particulates and heat them to a temperature from 1000° C. to 1200° C. to produce heated reduced inorganic particulates;
   passing said heated reduced inorganic particulates as a moving bed through at least a portion of a dehydrogenation reactor while flowing one or more alkanes through the dehydrogenation reactor at a temperature from 750° C. to 1200° C. for a period of time less than 2 minutes at a gas hourly space velocity for the one or more alkanes from 500 $hr^{-1}$ to 6000 $hr^{-1}$, and a weight hourly space velocity from 0.5 $hr^{-1}$ to 60 $hr^{-1}$, to produce a product stream comprising: $H_2$, one or more olefins, steam, and mixtures of alkynes, aromatics, di-olefins, heavy hydrocarbons and coke; and
   passing the reduced inorganic particulates from said dehydrogenation reactor to said oxidation reactor,

TABLE 1

Mass Balance for Example 1 (All Mass Flows in kg/hr)

Streams as Shown in FIG. 2

| | 104 | 105 | 106 | 107 | 108 | 109 | 110 | 111 | 112 | 113 |
|---|---|---|---|---|---|---|---|---|---|---|
| Temperature (° C.) | 500 | 830 | 830 | 1324 | 1214 | 20 | 1324 | 20 | 1214 | 20 |
| Pressure (kPag) | 101 | 101 | 101 | 101 | 101 | 101 | 101 | 101 | 101 | 101 |
| Mass Vapour Fraction | 1 | 1 | 0 | 0 | 0 | 1 | 1 | 1 | 1 | 1 |
| Total Mass Flow (kg/hr) | 1746 | 1746 | 25172 | 27065 | 24921 | 9274 | 7382 | 545 | 2689 | 1746 |
| $CH_4$ | | | | | | | | 545 | 70 | |
| $C_2H_6$ | 1746 | 611 | | | | | | | | 1746 |
| $C_2H_4$ | | 994 | | | | | | | | |
| $H_2$ | | 77 | | | | | | | | |
| $CO_2$ | | | | | | | | | 1302 | |
| $H_2O$ | | | | | | | | | 1066 | |
| Other Hydrocarbons | | 64 | | | | | | | | |
| $N_2$ | | | | | | 7214 | 7214 | | | |
| $O_2$ | | | | | | 2060 | 167 | | | |
| Solids | | | 25172 | 27065 | 24921 | | | | 251 | | wherein:
after producing the oxidized inorganic particulates and before passing the oxidized inorganic particulates through the fuel reactor, the oxidized inorganic particulates do not pass through the dehydrogenation reactor; and after producing the heated reduced inorganic particulates and before passing the reduced inorganic particulates from said dehydrogenation reactor to said oxidation reactor, the heated reduced inorganic particulates are not oxidized.

2. The process according to claim 1, wherein the one or more alkanes in the dehydrogenation reactor comprise one or more $C_2$-$C_4$ alkanes.

3. The process according to claim 1, wherein the reduced inorganic particulates are selected from at least one promoter selected from the group consisting of Lithium (Li), Sodium (Na), Magnesium (Mg), Phosphorus (P), Potassium (K), Calcium (Ca), Titanium (Ti), Vanadium (V), Chromium (Cr), Manganese (Mn), Iron (Fe), Cobalt (Co), Nickel (Ni), Copper (Cu), Zinc (Zn), Gallium (Ga), Arsenic (As), Rubidium (Rb), Strontium (Sr), Yttrium (Y), Zirconium (Zr), Niobium (Nb), Molybdenum (Mo), Ruthenium (Ru), Tin (Sn), Antimony (Sb), Cesium (Cs), Barium (Ba), Lanthanum (La), Cerium (Ce), Praseodymium (Pr), Samarium (Sm), Tungsten (W), Bismuth (Bi), and combinations thereof.

4. The process according to claim 1, wherein the oxidation reactor is operated at a temperature from 500° C. to 1300° C.

5. The process according to claim 1, wherein the oxidation reactor is a riser reactor.

6. The process according to claim 1, wherein the oxidation reactor is a fluid catalytic cracking reactor.

7. The process according to claim 1, wherein the oxidation reactor is a circulating bed reactor.

8. The process according to claim 4, wherein the dehydrogenation reactor has an outlet temperature from 850° C. to 1200° C.

9. The process according to claim 1, wherein not less than 80 wt % of the inorganic particles in the oxidation reactor are oxidized to a higher oxidation state.

10. The process according to claim 1, wherein the particle size of the reduced inorganic particulates is from 40 to 150 microns.

11. The process according to claim 1, wherein in the oxidation reactor the gas hourly space velocity for the oxidant is from 1000 $hr^{-1}$ to 5000 $hr^{-1}$, and the weight hourly space velocity is from 0.5 $hr^{-1}$ to 60 $hr^{-1}$.

12. The process according to claim 1, wherein the fuel for the fuel reactor is natural gas.

13. The process according to claim 1, wherein in the fuel reactor the gas hourly space velocity for the fuel is from 1000 $hr^{-1}$ to 5000 $hr^{-1}$, and the weight hourly space velocity from 0.5 $hr^{-1}$ to 60 $hr^{-1}$.

14. The process according to claim 1, wherein in the dehydrogenation reactor the gas hourly space velocity for the alkane and steam is from 1000 $hr^{-1}$ to 5000 $hr^1$, and the weight hourly space velocity from 0.5 $hr^{-1}$ to 60 $hr^{-1}$.

15. The process according to claim 1, further comprising extracting heat from exhaust from the fuel reactor and providing heat to the one or more alkanes prior to the one or more alkanes entering the dehydrogenation reactor.

16. The process according to claim 1, where the one or more alkanes comprise one or more $C_2$-$C_8$ alkanes.

17. The process according to claim 1, wherein the one or more alkanes comprise ethane.

18. The process of claim 1, further comprising flowing steam through the dehydrogenation reactor while passing said heated reduced inorganic particulates as a moving bed through at least the portion of the dehydrogenation reactor and flowing the one or more alkanes through the dehydrogenation reactor.

19. A process, comprising:
passing a moving bed of reduced inorganic particulates having a melting temperature greater than 1500° C. through an oxidation reactor at a temperature from 300° C. to 1200° C., wherein not less than 20 wt % of the reduced inorganic particulates passing through the oxidation reactor are oxidized to produce oxidized inorganic particulates;

passing the oxidized inorganic particulates to and through a moving bed in a fuel reactor together with natural gas in the absence of a gaseous oxidant to burn the natural gas and any surface carbon on the oxidized inorganic particulates and reduce the oxidized inorganic particulates and heat them to a temperature from 1000° C. to 1200° C. to produce heated reduced inorganic particulates;

passing the heated reduced inorganic particulates as a moving bed through at least a portion of a dehydrogenation reactor while flowing one or more alkanes through the dehydrogenation reactor at a temperature from 750° C. to 1200° C. to produce a product stream comprising $H_2$ and one or more olefins; and passing the reduced inorganic particulates from the dehydrogenation reactor to the oxidation reactor.

20. A process, comprising:
passing a moving bed of reduced inorganic particulates having a melting temperature greater than 1500° C. through an oxidation reactor at a temperature from 300° C. to 1200° C., wherein not less than 20 wt % of the reduced inorganic particulates passing through the oxidation reactor are oxidized to produce oxidized inorganic particulates;

passing the oxidized inorganic particulates to and through a moving bed in a fuel reactor together with a fuel in the absence of a gaseous oxidant to burn the fuel and any surface carbon on the oxidized inorganic particulates and reduce the oxidized inorganic particulates and heat them to a temperature from 1000° C. to 1200° C. to produce heated reduced inorganic particulates;

passing the heated reduced inorganic particulates as a moving bed through at least a portion of a dehydrogenation reactor while flowing one or more alkanes through the dehydrogenation reactor at a temperature from 750° C. to 1200° C. to produce a product stream comprising $H_2$ and one or more olefins;

passing the reduced inorganic particulates from the dehydrogenation reactor to the oxidation reactor, wherein the process further comprises extracting heat from exhaust from the fuel reactor and providing heat to the one or more alkanes prior to the one or more alkanes entering the dehydrogenation reactor.

* * * * *

UNITED STATES PATENT AND TRADEMARK OFFICE
CERTIFICATE OF CORRECTION

| | |
|---|---|
| PATENT NO. | : 11,549,063 B2 |
| APPLICATION NO. | : 17/435088 |
| DATED | : January 10, 2023 |
| INVENTOR(S) | : Vasily Simanzhenkov, Rabi Dey and Hany Farag |

It is certified that error appears in the above-identified patent and that said Letters Patent is hereby corrected as shown below:

In the Claims

In Column 9, Line 58, Claim 14, please replace "5000 hr$^1$," with -- 5000 hr$^{-1}$, --.

In Column 10, Line 1, Claim 16, please replace "where" with -- wherein --.

Signed and Sealed this
Fourteenth Day of March, 2023

*Katherine Kelly Vidal*
*Director of the United States Patent and Trademark Office*